US012716358B1

(12) United States Patent
Shabbir et al.

(10) Patent No.: US 12,716,358 B1
(45) Date of Patent: Aug. 25, 2026

(54) LOCALIZED RIBLETS FOR A FLOWPATH SURFACE

(71) Applicant: General Electric Company, Evendale, OH (US)

(72) Inventors: Aamir Shabbir, Westlake, OH (US); William J. Solomon, Montgomery, OH (US); Matthew F. Adam, West Chester, OH (US); Daniel Allen Wilkin, II, West Chester, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/065,318

(22) Filed: Feb. 27, 2025

(51) Int. Cl.
*F01D 5/14* (2006.01)
*F01D 5/30* (2006.01)

(52) U.S. Cl.
CPC ............... *F01D 5/147* (2013.01); *F01D 5/30* (2013.01); *F05D 2240/30* (2013.01)

(58) Field of Classification Search
CPC ........ F01D 5/147; F01D 5/30; F05D 2240/30; F05D 2240/306
See application file for complete search history.

(56) References Cited

U.S. PATENT DOCUMENTS 3,423,069 A 1/1969 Chandley
3,463,418 A 8/1969 Miksch
4,108,573 A 8/1978 Wagner
4,720,239 A 1/1988 Owczarek
5,337,568 A * 8/1994 Lee .......................... F23R 3/002 60/755
6,213,711 B1 * 4/2001 Muller .................... F01D 5/145 415/220
7,484,937 B2 2/2009 Johann
9,046,111 B2 6/2015 Harvey
10,107,302 B2 10/2018 Berschback
10,443,399 B2 10/2019 Jones
10,450,867 B2 10/2019 Bunker
10,450,868 B2 * 10/2019 Jones ...................... F01D 5/145
10,465,520 B2 11/2019 Vandeputte
10,605,087 B2 * 3/2020 Xu .......................... F01D 5/141
11,608,745 B2 3/2023 Rao
(Continued)

FOREIGN PATENT DOCUMENTS

FR 3127024 3/2023
FR 3127025 3/2023
FR 3127269 3/2023
(Continued)

*Primary Examiner* — Michael L Sehn
(74) *Attorney, Agent, or Firm* — Fitch, Even, Tabin & Flannery LLP

(57) ABSTRACT

A turbine engine compressor airfoil includes a body having a root coupled to a hub or casing of a turbine engine, the body extending in a radial direction from the root to a tip and in an axial direction from a leading edge to a trailing edge, the body defining a pressure side and a suction side opposite the pressure side, a ribbed section extending from the body on the suction side, the ribbed section comprising a plurality of discrete localized riblets, each riblet extending at least 90% of a chord length from the leading edge to the trailing edge at a span-wise location of the airfoil between the root and the tip, and the ribbed section extends 0-20% of a span of the airfoil from the root to the tip.

20 Claims, 7 Drawing Sheets

(56) References Cited

U.S. PATENT DOCUMENTS

| | | | | |
|---|---|---|---|---|
| 2017/0159442 | A1 * | 6/2017 | Velazquez, Jr. ......... | F01D 5/288 |
| 2023/0059927 | A1 | 2/2023 | Johnson | |

FOREIGN PATENT DOCUMENTS

| | | |
|---|---|---|
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |

* cited by examiner

LOCALIZED RIBLETS FOR A FLOWPATH SURFACE

TECHNICAL FIELD

These teachings relate generally to localized riblets for a flowpath surface and more particularly to riblets disposed on locations of airfoils in gas turbine engines.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. The compressor and turbine sections typically includes a plurality of sequentially arranged stages of stationary or rotating blade-rows. Each of the stationary or rotating blade-rows within the various compressor or turbine stages include one or more flowpath. The turbine section typically includes a plurality of sequentially arranged stage(s) of turbine nozzles and turbine rotor blades. Each of the turbine nozzles within the various stages of turbine nozzles and each of the turbine rotor blades within the various stages of turbine rotor blades include one or more flowpath surfaces.

BRIEF DESCRIPTION OF DRAWINGS

Various needs are at least partially met through provision of the localized riblets for a flowpath surface described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
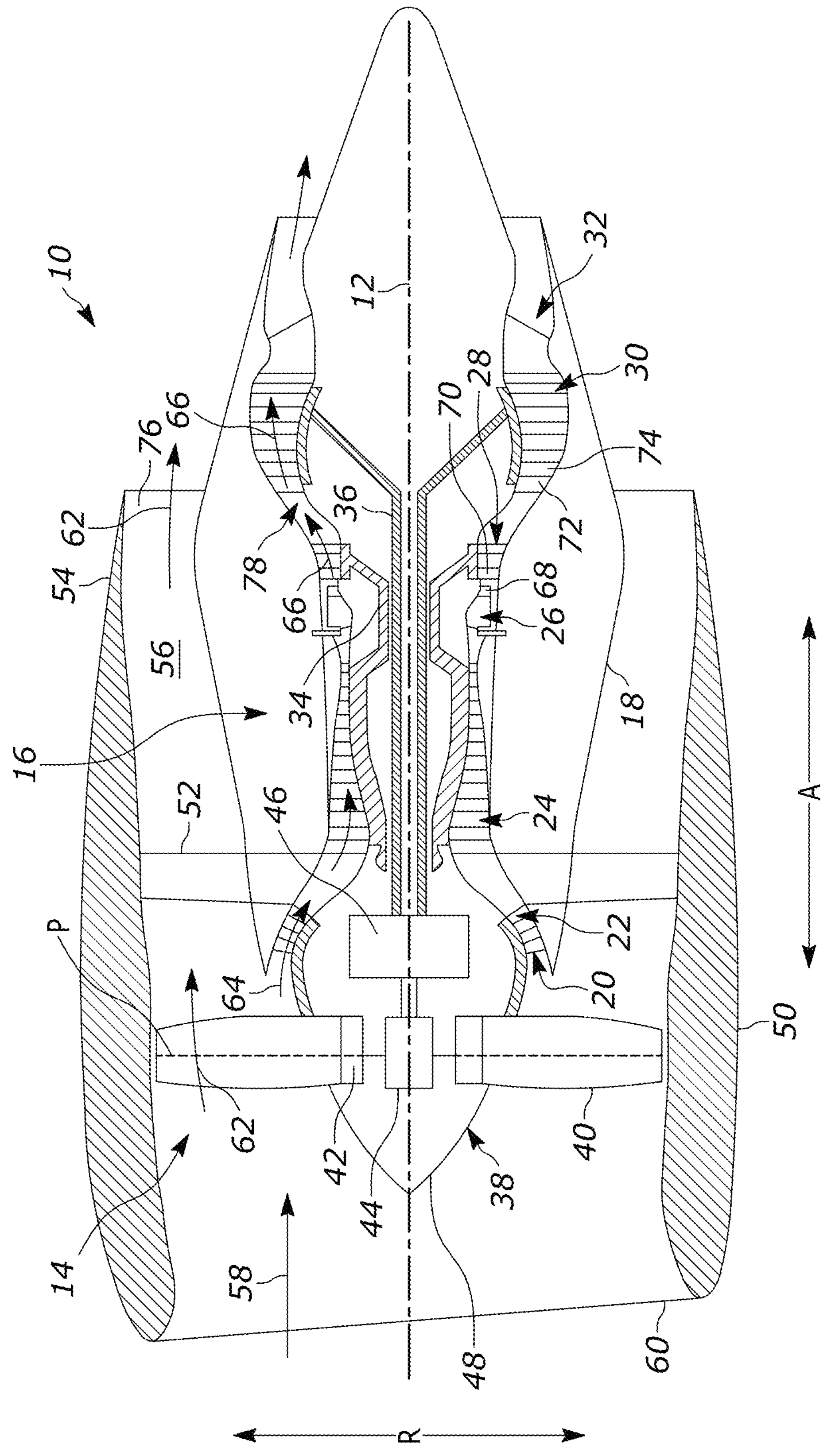
FIG. 1 comprises a schematic view of a gas turbine engine in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Reference now will be made in detail to embodiments of the present disclosure, one or more examples of which are illustrated in the drawings. Each example is provided by way of explanation of the present disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise. As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Airfoils are generally attached to a hub and/or a casing in a gas turbine engine. These attachment locations, near the hub and casing, may be locations of flow weakness when looking at different sections of an airfoil. These locations of weaknesses may result in losses in efficiency and can create flow separation. Further, these locations of weaknesses may be exacerbated when the gas turbine engine is operated at off-design conditions, for example, during throttle conditions. These in turn limit the stall margin of the associated stage. Some proposed solutions are to place riblets along the whole of the airfoil. As the riblets are costly to create and maintain, placing the riblets along the whole airfoil may be wasteful. Additionally, by placing riblets on the whole airfoil, the weaknesses near the hub relative to the casing remain as the benefits of the riblets are provided to the whole of the airfoil. These are significant challenges in the context of aviation application settings.

Different flowpath surfaces within the compressor and turbine sections are exposed to different airflow conditions. Additionally, different airflow conditions react differently to different patterns, shapes, sizes, and locations of riblets disposed on the flowpath surfaces. For example, the riblets may be beneficial given the airflow conditions at a first flowpath surface, while the riblets may provide no benefit, and may even cause detrimental effects, given the airflow conditions at a second flowpath surface.

Generally speaking, the various aspects of the present disclosure can be employed with an airfoil including a leading edge, a trailing edge, a pressure side, and a suction side. The airfoil is coupled to a hub or a casing of a gas turbine engine at a root and spans to a tip, and the airfoil includes a ribbed section on the suction side. The ribbed section may include a plurality of discrete localized riblets each riblet extending at least 90% of a chord length from the leading edge to the trailing edge at a span-wise location of riblet. The ribbed section may extend 1-20% of a span of the airfoil from the root to the tip.

Additionally, or alternatively, the ribbed section may have a first density of discrete localized riblets near the hub or the casing greater than a second density of discrete localized riblets between the root and the tip. Each riblet may extend at least 90% of a chord length from the leading edge to the trailing edge at a span-wise location of the riblet.

In some embodiments, the ribbed section is disposed between 0-20% and/or 80-100% span-wise location from the root of the airfoil. Additionally, in some configurations, the ribbed section is disposed on 100% of the chord length of the airfoil from the leading edge to the trailing edge of the airfoil. In further configurations, the ribbed section includes discrete riblets having a substantially triangular shape. At the leading edge the discrete riblets may include a thickness, or height protruding at the normal angle, i.e., at an angle of 90°, outward from the surface of the airfoil of approximately 0.02% to 0.1% of the chord length. At the trailing edge the discrete riblets may include a thickness, or height protruding outward from the surface of the airfoil. of approximately 0.02% to 0.2% of the chord length. In some embodiments, the thickness of the discrete riblets at the trailing edge may be 1 to 2 times the thickness of the discrete riblets at the leading edge.

In further embodiments, the discrete riblets may include a uniform space therebetween such that the riblets are substantially parallel to one another along the chord length from the leading edge to the trailing edge. In other configurations, the discrete riblets may include a non-uniform or varying space therebetween such that the riblets are non-parallel to one another along the chord length from the leading edge to the trailing edge. Additionally, in some embodiments, the discrete riblets may include a varying thickness along the chord length of the airfoil.

In some configurations, the first density of discrete riblets is disposed between 0-20% and/or 80-100% span wise location from the root. The first density includes the number of discrete riblets divided by the amount of span on which the discrete riblets are disposed. The second density of discrete riblets is disposed between 20-80% span-wise location from the root of the airfoil. In some configurations, the second density is 0. In this way, there are no discrete riblets disposed between 20-80% span-wise location from the root of the airfoil. In other configurations, the second density is 75% less than the first density.

The foregoing and other benefits may become clearer upon making a thorough review and study of the following detailed description.

Referring now to the drawings, wherein identical numerals indicate the same elements throughout the figures, FIG. 1 illustrates a schematic view of an exemplary gas turbine engine. For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of outlet guide vanes 52 that is spaced circumferentially about the nacelle 50. Moreover, a downstream section 54 of the nacelle 50 extends over an outer portion of the core turbine engine 16 to define a bypass airflow passage 56 therebetween.

During operation of the turbine engine 10, flowing substantially along the axial direction, A, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air flow 64 is directed or is routed into the upstream section of the core air flow path, or, more specifically, into the annular inlet 20 of the LP compressor 22. The ratio between the first portion of air 62 and the second portion of air flow 64 is commonly known as a bypass ratio. The pressure of the second portion of air flow 64 is then increased, forming compressed air, and the compressed air is routed through the HP compressor 24 and into the combustion section 26, where the compressed air is mixed with fuel and burned to provide combustion gases 66.

The combustion gases 66 are routed into the HP turbine 28 and expanded through the HP turbine 28 where a portion of thermal energy and/or kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal energy and/or the kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbine engine 10 depicted in FIG. 1 is provided by way of example only, and that in other exemplary embodiments, the turbine engine 10 may have any other suitable configuration. It should also be appreciated that in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine. Further, in still other embodiments, aspects of the present disclosure may be incorporated into any other suitable turbomachine, including, without limitation, a steam turbine, a centrifugal compressor, and/or a turbocharger.

Figure 2A:
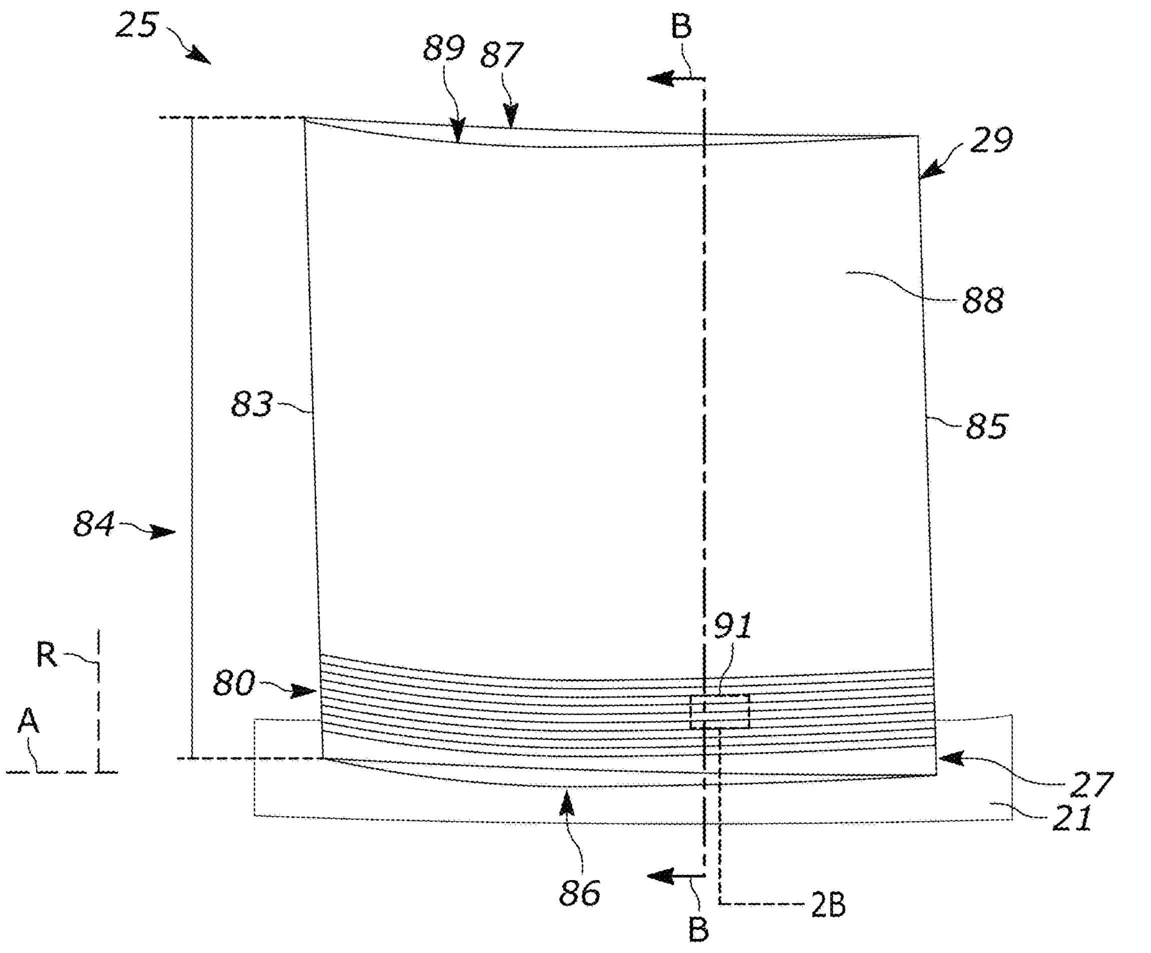
FIG. 2A comprises a perspective view of an airfoil in accordance with various embodiments of these teachings.
Figure 2B:
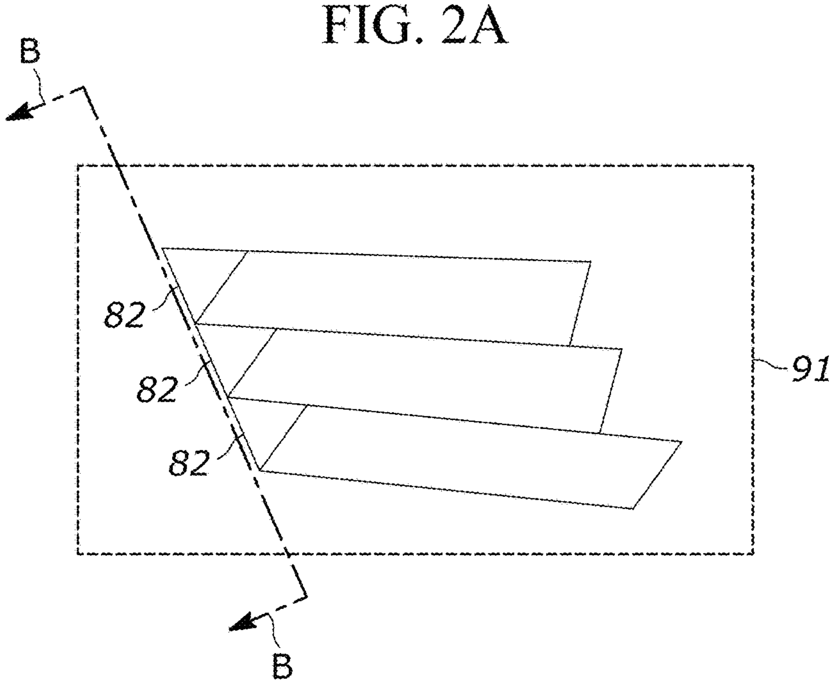
FIG. 2B comprises a partial view of the airfoil of FIG. 2A including riblets disposed thereon in accordance with various embodiments of these teachings.
Figure 2C:
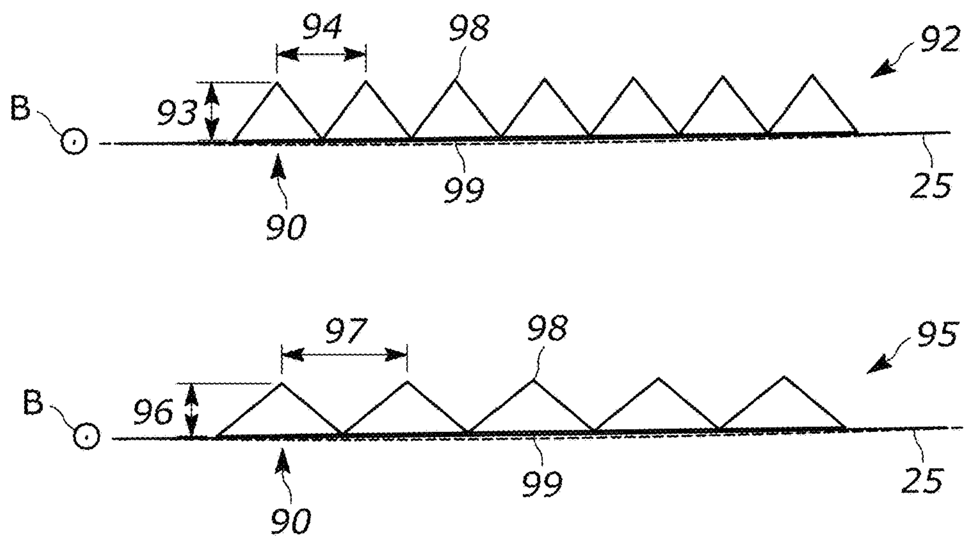
FIG. 2C comprises a cross-section view along a span of the airfoil of FIG. 2A including riblets disposed thereon in accordance with various embodiments of these teachings.

Referring to FIGS. 2A to 2C, an airfoil 25 is shown extending outwardly from the hub 21. In some embodiments, the airfoil 25 may be used in the LP compressor 22 and/or the HP compressor 24, as described with reference to FIG. 1. The airfoil 25 extends radially outward from the longitudinal centerline axis 12, shown in FIG. 1, along the radial direction R. The airfoil 25 includes a body 88. The body 88 has a root 27 coupled to a hub 21 or casing 19 (FIG. 2A depicts coupling to the hub 21). The body 88 extends in the radial direction R from the root 27 to a tip 29. The body 88 also extends in an axial direction A from a leading edge 83 to a trailing edge 85. The body 88 defines a pressure side 87 and a suction side 89.

The airfoil 25 includes a span 84. The span 84 is defined as the height of the airfoil 25 in the radial direction R extending from the root 27 to the tip 29, described in more detail below. The root 27 is the location where the airfoil 25 couples to the hub 21. The airfoil 25 includes span-wise locations which refers to a particular location and/or range of the span 84 when traversing the airfoil 25 in the radial direction from the root 27 to the tip 29, wherein 0% span-wise location is at the root 27 and 100% span-wise location is at the tip 29. For example, 20% span refers to 20% of the total length of the airfoil 25 in the radial direction R, while 0%-20% span-wise location refers to the 20% of the airfoil 25 closest to the root 27.

The airfoil 25 also includes a chord length 86. The chord length 86 is defined as the length of the airfoil 25 in the axial direction A extending from the leading edge 83 to the trailing edge 85, opposite the leading edge 83. The airfoil 25 also includes a pressure side 87 and a suction side 89, opposite the pressure side 87. Both the pressure side 87 and the suction side 89 defined between the leading edge 83 and the trailing edge 85. Both the pressure side 87 and the suction side 89 include a chord length 86. In some embodiments, the chord length 86 of the pressure side 87 is different than the chord length 86 of the pressure side 87.

The airfoil 25 also includes a ribbed section 80 disposed along a portion of the airfoil 25, more specifically, on the suction side 89 of the airfoil 25. As shown in FIG. 2A, the ribbed section 80 is disposed at a lower (e.g., under 50%) span-wise location near the root 27. In some embodiments, the ribbed section may located within and/or extend between 0-20% of the span-wise location from the root 27. FIG. 2B includes an enlarged view of a portion of the ribbed section 80 which illustrates a sectional view the boxed portion 91 of the ribbed section 80 from FIG. 2A. The boxed portion 91 includes a cross section of the individual discrete riblets 82 extending outward from the body 88. The cross section is taken from the plane B which extends along the radial direction R, from the root 27 to the tip 29, and crosses the individual discrete riblets 82 along the chord length 86 of the airfoil 25. The ribbed section 80 includes multiple individual discrete riblets 82. The boxed portion 91 of the ribbed section 80 provides a close-up of the individual discrete riblets 82 from the ribbed section 80 extending in the same direction shown in FIG. 2A.

Referring to FIG. 2C, a cross section of the individual discrete riblets 82 are illustrated. The cross-sections are shown cut from the plane B, described above, and are viewed axially down the body 88 of the airfoil 25. As shown in FIG. 2C, the plane B is directed out of the page. The cross-sections shown are contemplated as examples of spacing and thicknesses of the individual discrete riblets 82, both alone, e.g., using the spacing and thickness of either cross-section for substantially of the plurality of individual discrete riblets 82 disposed on the airfoil 25, or in combination with one another, e.g., using the spacing and thickness of one of the cross-sections for a portion of the plurality of individual discrete riblets 82, and transitioning to the second cross-section for the remaining portion of the plurality of individual discrete riblets 82 disposed on the airfoil 25. The spacings described herein are radial distances between the riblet peaks 98 of each adjacent individual discrete riblet 82. The spacings are in the same radial direction R as the span 84 of the airfoil 25. The thicknesses described herein are distances from a riblet root 99, coupled to the body 88 of the airfoil 25, to the riblet peak 98, extending outward from the body 88.

The first cross-section 92 includes a spacing 94 and a thickness 93 of the individual discrete riblets 82 defined as the height of the individual discrete riblets 82 extending from the surface of the airfoil 25. Similarly, the second cross-section 95 includes a spacing 97 and a thickness 96 of the individual discrete riblets 82 defined as the height of the individual discrete riblets 82 extending from the surface of the airfoil 25. In some configurations, first cross-section 92 illustrates the spacing 94 and thickness 93 of the individual discrete riblets 82 near the leading edge 83 while the second cross-section 95 illustrates the spacing 97 and thickness 96 of the individual discrete riblets 82 near the trailing edge 85. As noted above, in some embodiments, the first cross-section 92 and second cross-section 95 may be utilized along the entire chord length 86 of the airfoil 25 without any substantial change to the spacing and thickness of the discrete riblets along the chord length 86.

The spacings 94 and 97 may be expressed as a fraction of the chord length 86, as illustrated and discussed above with reference to FIG. 2A for example, the spacings 94 and 97 may be about 0.015% to 0.12% of the chord length 86. As such, the spacings 94 and 97 may be sized consistently for different chord lengths to provide the benefits described herein. In other configurations, the spacings 94 and 97 vary along the chord length 86 such that the individual discrete riblets 82 are non-parallel to one another as they progress from the leading edge 83 to the trailing edge 85. In this way, as one example, the spacing 94 between the individual discrete riblets 82 near the leading edge 83, is smaller than the spacing 97, between the individual discrete riblets 82 near the trailing edge 85. The spacing 94 between the individual discrete riblets 82 at the leading edge 83 ranges from approximately 0.015% to 0.12% of the chord length 86 and the spacing 97 between the individual discrete riblets 82 at the trailing edge 85 ranges from 0.015% to 0.24% of the chord length 86. In some embodiments, the spacing 97 between the discrete riblets 82 at the trailing edge 85 may be 1 to 2 times greater than the spacing 94 at the leading edge 83.

Referring still to FIG. 2C, the thicknesses 93 and 96 may be expressed as a fraction of the chord length 86, for example, the thicknesses 0.02% to 0.1% of the chord length 86. As such, the thicknesses 93 and 96 may be sized consistently for different chord lengths to provide the benefits described herein. As noted above, the thickness of the riblets may be defined as the height of the individual discrete riblets 82 extending from the surface of the airfoil 25. Further, the individual discrete riblets 82 may include a substantially triangular cross-section such that the individual discrete riblets 82 are substantially triangular shaped. As shown in FIG. 2C, the cross-sections 92 and 95 includes a base side 90 disposed on the surface of the airfoil 25. The individual discrete riblets 82 include a thickness 93 of approximately 0.04% to 0.06% of the chord length 86 near the leading edge 83 and a thickness of approximately 0.02% to 0.03% of the chord length 86 near the trailing edge 85. Due to the geometry of the airfoil 25 along the chord length 86, the ribbed section 80, and in turn the individual discrete riblets 82, generally are thicker near the trailing edge 85 than the leading edge 83. It is contemplated that the thickness of the individual discrete riblets 82 may be substantially the same along the airfoil 25 or may vary having a thicker section at any point along the chord length 86 of the airfoil 25. It is further contemplated that the individual discrete riblets 82 tapers near the trailing edge 85 of the airfoil 25.

In one exemplary embodiment, the airfoil 25 includes the ribbed section 80 disposed near the hub 21, along a portion of the root 27. This portion may extend about 5-20% of the span-wise location of the airfoil 25. The spacings of the individual discrete riblets 82 within the ribbed section 80 may increase from leading edge 83 towards the trailing edge 85. The spacing change may follow the shape of the airfoil 25. As described in more detail below, the angle of the hub 21 and/or casing 19 may determine the relative spacing of the individual discrete riblets 82. In configurations where the span 84 varies between the leading edge 83 and the trailing edge 85, the spacing and resulting angle between the individual discrete riblets 82 may be changed accordingly as outlined just above.

In some configurations, the individual discrete riblets 82 are disposed with varying spacings between adjacent riblets. The spacing between the individual discrete riblets 82 may be different for any number of individual discrete riblets 82 of the ribbed section 80 as compared to one another. In this way, the spacing between the individual discrete riblets 82 may vary for any number of riblets, adjacent or otherwise. For example, half of the individual discrete riblets 82 may include a first spacing 94, from FIG. 2C, between the riblets while a quarter of the remaining individual discrete riblets 82 include a second spacing 97, from FIG. 2C, therebetween, and the final quarter of the remaining individual discrete riblets 82 include a third spacing therebetween, where the first spacing, the second spacing, and the third spacing are different.

Figure 2D:
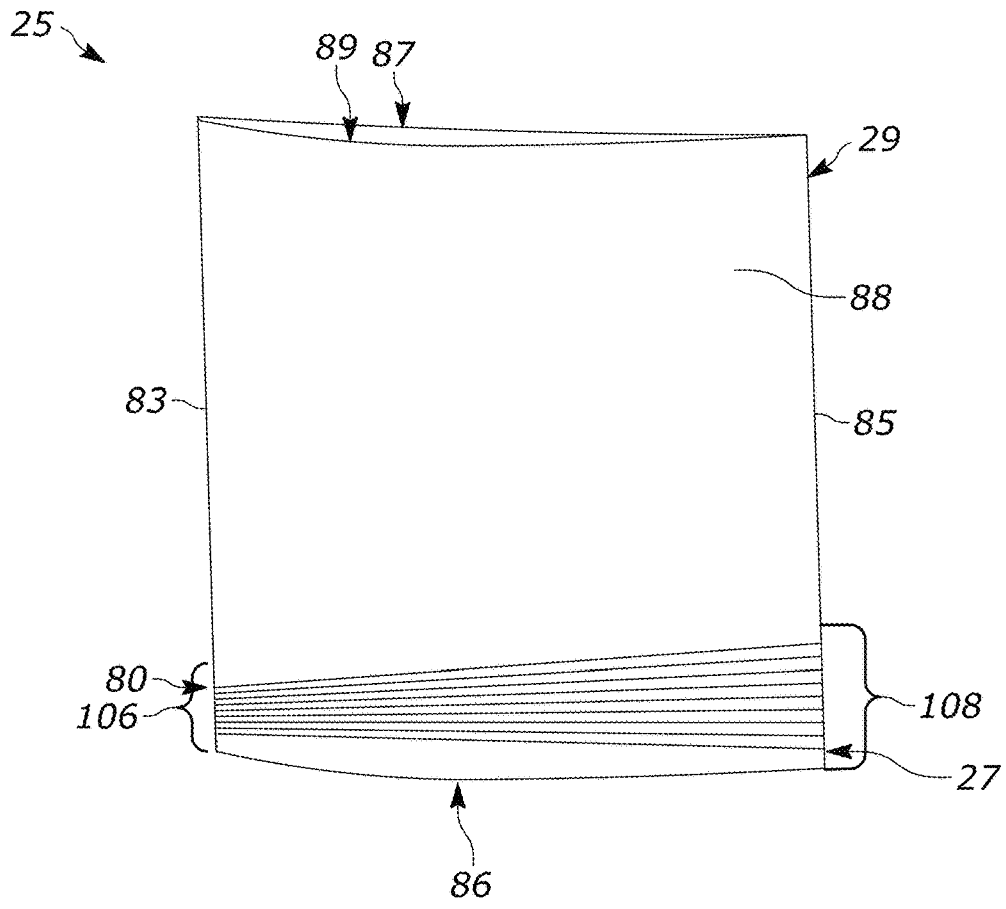
FIG. 2D comprises a perspective view of an airfoil in accordance with various embodiments of these teachings.

As shown in FIG. 2D, in some embodiments, the spacing between the individual discrete riblets 82 may differ from the leading edge 83 to the trailing edge 85 along the chord length 86. For example, the spacing 106 of the individual discrete riblets 82 near the leading edge 83 may be less than the spacing 108 of the individual discrete riblets 82 near the trailing edge 85. As shown in FIG. 2D, the spacing 106 at the leading edge 83 is less than the spacing 108 at the trailing edge 85. This results in the adjacent riblets being disposed at a non-parallel angle relative to one another. The spacings between adjacent riblets may be selected to achieve a desired angle between the adjacent riblets.

Figure 3A:
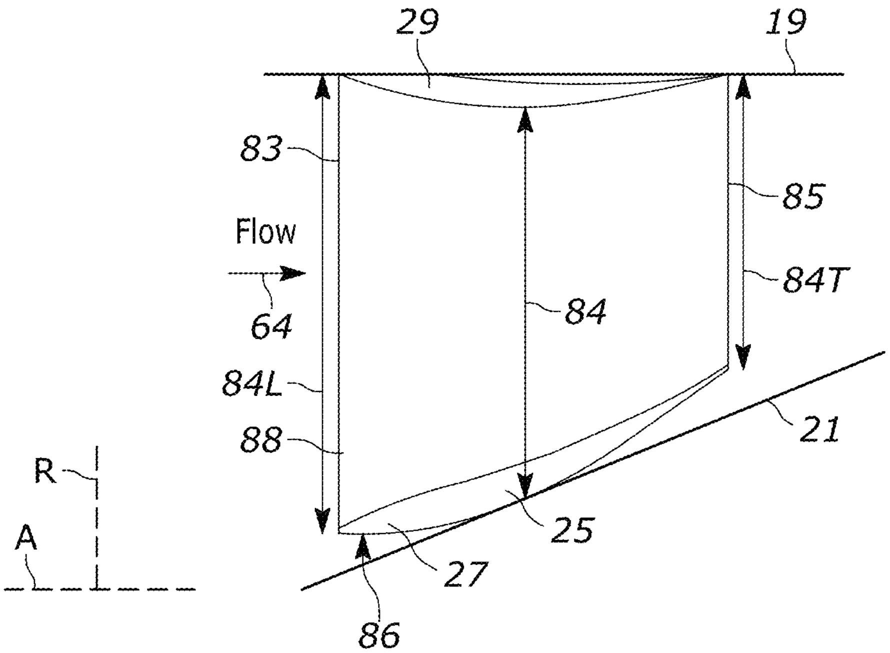
FIG. 3A comprises a schematic view of a flowpath surface without riblets in accordance with various embodiments of these teachings.
Figure 3B:
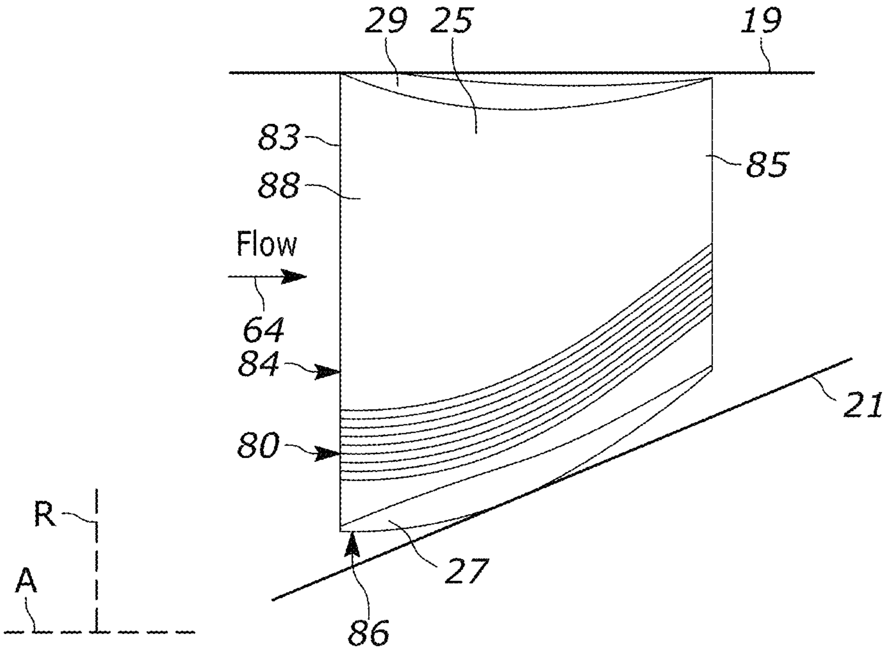
FIG. 3B comprises a schematic view of a flowpath surface with riblets in accordance with various embodiments of these teachings.

Referring now to FIGS. 3A and 3B, an exemplary schematic perspective view of an airfoil 25 is illustrated coupled to the casing 19 and an angled hub 21. The airfoil 25, similar to the HP turbine rotor blades 70 is coupled to the casing 19 at a tip 29 of the airfoil 25. The airfoil 25 is coupled to the hub 21 at a root 27 of the airfoil 25. The airfoil 25 includes the span 84 which is defined as the height of the airfoil 25 from the root 27 to the tip 29, between the casing 19 and the hub 21. The span 84 may vary from a leading edge 83 of the airfoil to the trailing edge 85 of the airfoil 25, as illustrated in FIGS. 3A and 3B where the span 84L at the leading edge 83 is larger than the span 84T at the trailing edge 85 due to the geometry of the hub 21 and casing 19. Further, the airfoil 25 includes the chord length 86. The chord length 86 may be defined as the length of the airfoil 25 along the casing 19 and the hub 21 between the leading edge 83 and the trailing edge 85. Similar to the span 84, the chord length 86 may vary from the casing 19 to the hub 21, as illustrated in FIGS. 3A and 3B where the chord length 86 near the casing 19 is shorter than the chord length 86 near the hub 21 due to the geometry of the hub 21 and casing 19.

As provided for in FIG. 3B, the losses occur near the root 27 as the air flow 64 moves past the airfoil 25. These pressure losses could be due to the larger growth of viscous boundary layer in this span-wise location relative to smaller growth of viscous boundary layer in the other span-wise locations. The pressure losses could also be due to the secondary flow near the endwalls. To counteract the localized losses near the hub 21, the ribbed section 80 may be disposed on the airfoil 25, and in particular, nearer the root 27 of the airfoil 25 relative to the tip 29 of the airfoil 25. For example, in the embodiment shown in FIG. 3B, the ribbed section 80 is disposed at about 10-20% span-wise location of the airfoil 25. In some embodiments, the ribbed section 80 may be disposed within 0-20% of the span-wise location of the airfoil 25.

Figure 4A:
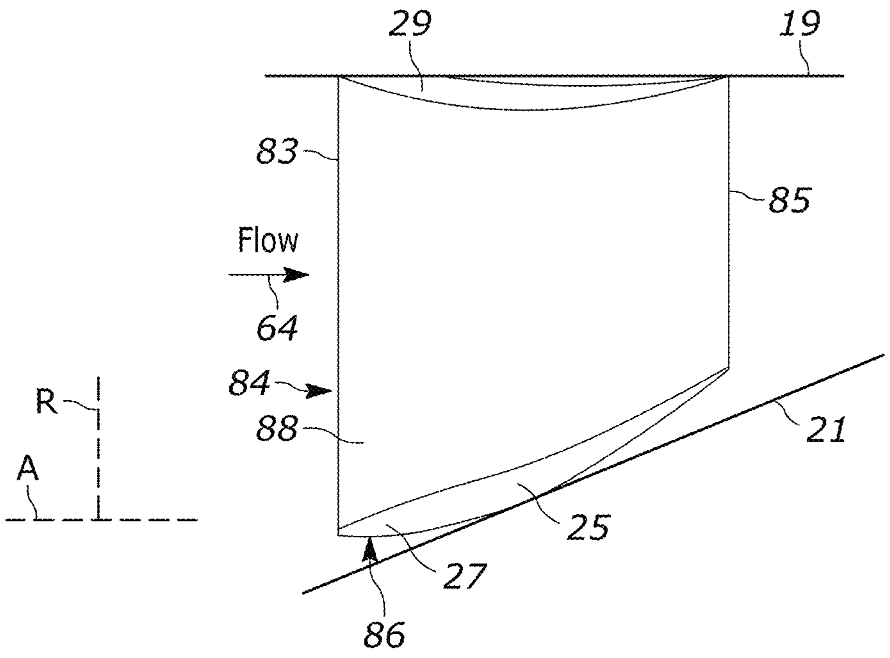
FIG. 4A comprises a schematic view of a flowpath surface without riblets in accordance with various embodiments of these teachings.
Figure 4B:
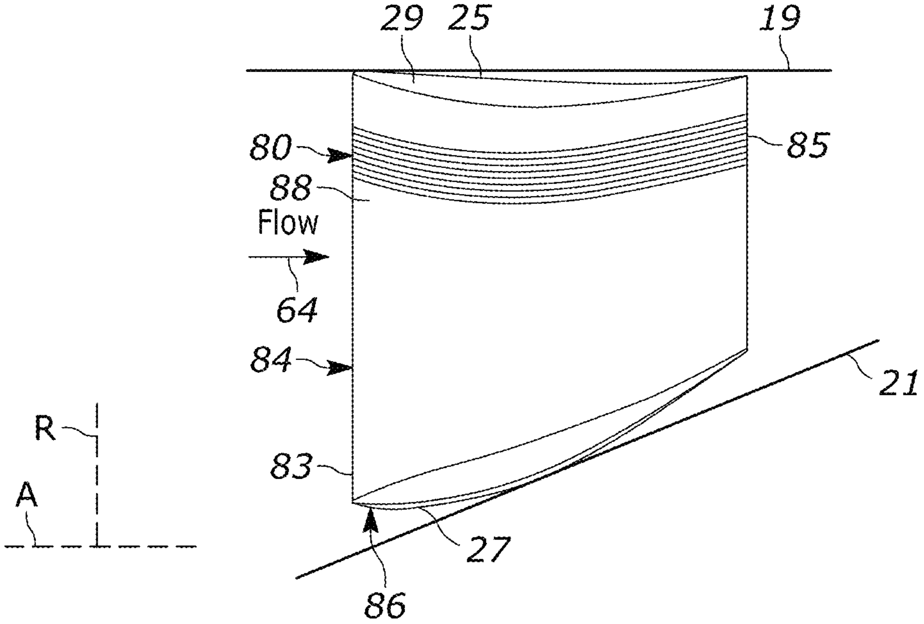
FIG. 4B comprises a schematic view of a flowpath surface with riblets in accordance with various embodiments of these teachings.

Referring to FIGS. 4A and 4B, the airfoil 25 includes a similar geometry as shown in FIGS. 3A and 3B, including a substantially flat casing 19 and an angled hub 21. However, FIGS. 4A and 4B provide an illustration where the losses occur near the tip 29 in FIG. 4A as the air flow 64 moves past the airfoil 25. To counteract the localized losses near the casing 19, the ribbed section 80 may be disposed on the airfoil 25, and in particular, nearer the tip 29 of the airfoil 25 relative to the root 27 of the airfoil 25. For example, as provided in FIG. 4B, the ribbed section 80 may be disposed within 80-90% span-wise location of the airfoil 25. However, it is contemplated that the ribbed section 80 may be disposed within 80-100% of the span-wise location, along the span 84, of the airfoil 25.

Figure 5A:
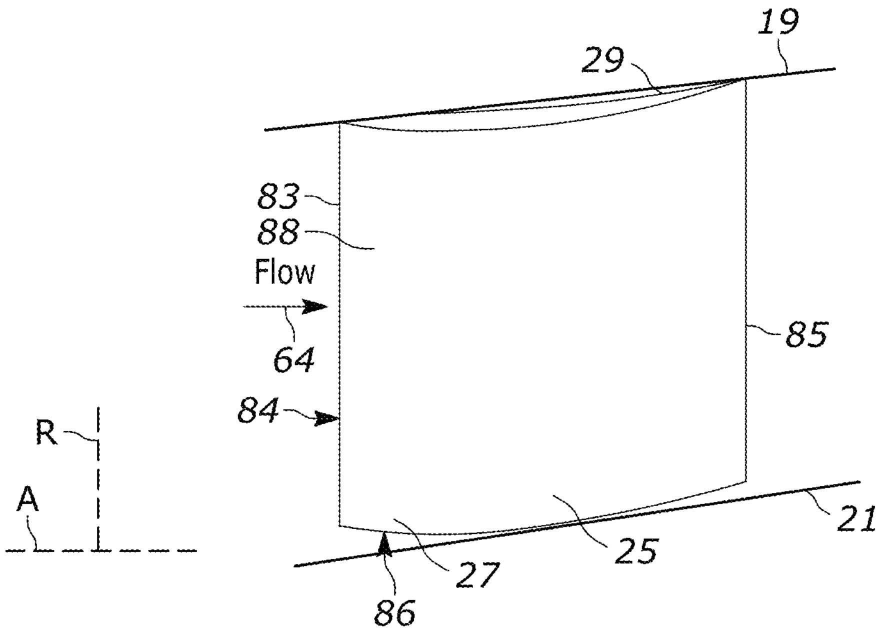
FIG. 5A comprises a schematic view of a flowpath surface without riblets in accordance with various embodiments of these teachings.
Figure 5B:
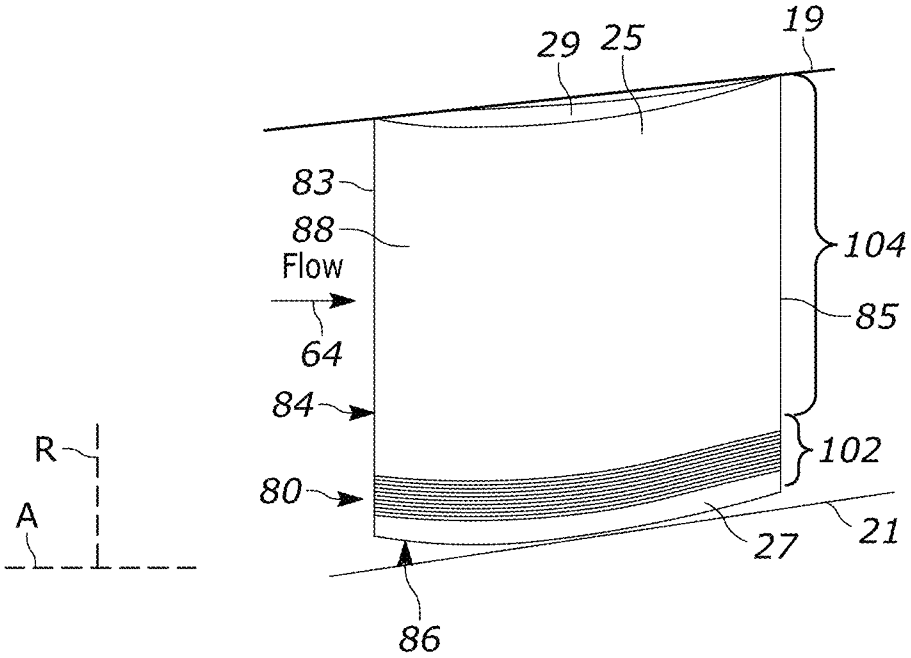
FIG. 5B comprises a schematic view of a flowpath surface with riblets in accordance with various embodiments of these teachings.

Referring to FIGS. 5A and 5B, the airfoil 25 includes a geometry such that the hub 21 and the casing 19 are substantially parallel to one another, resulting in the leading edge 83 and trailing edge 85 having the same or similar span. The losses may occur near the root 27 in FIG. 5A as the air flow 64 moves past the airfoil 25. To counteract the localized losses near the hub 21, similar to that shown and described with reference to FIGS. 3A and 3B, the ribbed section 80 may be disposed on the airfoil 25, and in particular, near the root 27 of the airfoil 25. As provided in FIG. 5B, the ribbed section 80 may be disposed within 5-20% span-wise location, along the span 84, of the airfoil 25.

Figure 6A:
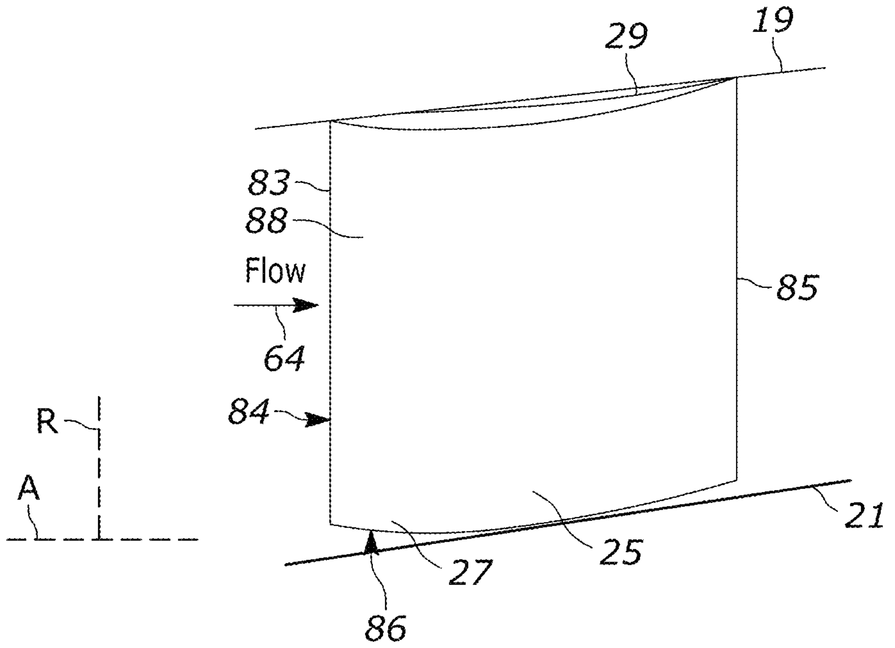
FIG. 6A comprises a schematic view of a flowpath surface without riblets in accordance with various embodiments of these teachings.
Figure 6B:
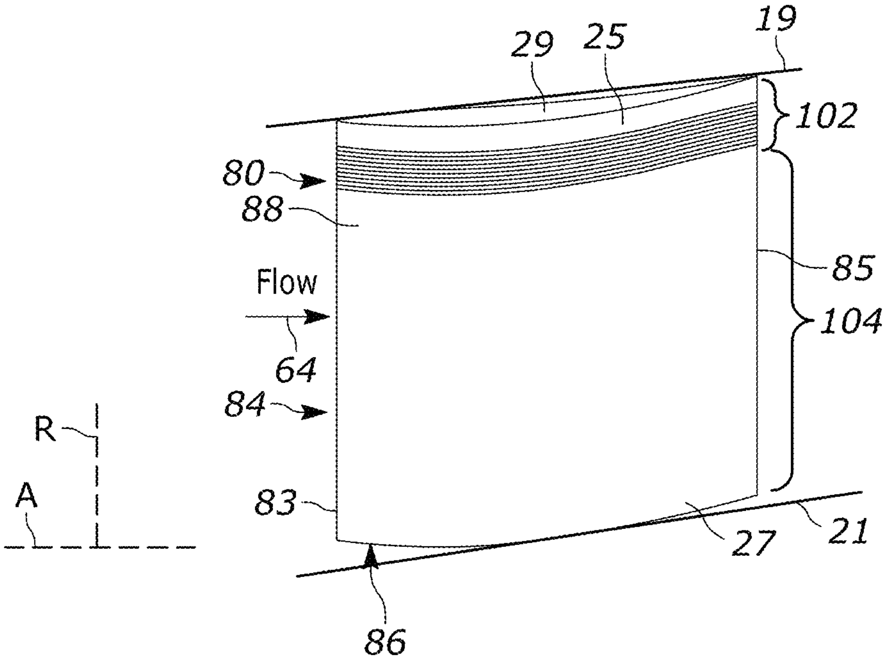
FIG. 6B comprises a schematic view of a flowpath surface with riblets in accordance with various embodiments of these teachings.

Referring to FIGS. 6A and 6B, the airfoil 25 includes a similar geometry as shown in FIGS. 5A and 5B, including a substantially parallel casing 19 and hub 21. However, FIGS. 6A and 6B provide an illustration where the losses occur near the tip 29 in FIG. 6A as the air flow 64 moves past the airfoil 25. To counteract the localized losses near the casing 19, the ribbed section 80 may be disposed on the airfoil 25, and in particular, near the tip 29 of the airfoil 25. As provided in FIG. 6B, the ribbed section 80 may be disposed within 80-95% span-wise location, along the span 84, of the airfoil 25.

The ribbed section 80 may be disposed on a span-wise location of the airfoil 25 at varying locations near the casing 19 and/or the hub 21. The ribbed section 80 extends generally in the axial direction. In one illustrative embodiment, the ribbed section 80 is disposed along at least 90% of the chord length 86 of the airfoil 25. Additionally, the ribbed section 80 extends between 1-20% of the span 84 of the airfoil 25. The ribbed section 80 may be disposed between 0-20% of the span-wise location of the airfoil 25 near the hub 21. Additionally, or alternatively, the ribbed section 80 may be disposed between 80-100% of the span-wise location of the airfoil 25 near the casing 19. In yet further embodiments, the ribbed section 80 may be disposed along the full chord length 86 of the airfoil 25.

In some embodiments, the airfoil 25 includes a first and a second grouping of individual discrete riblets 82, such that the airfoil 25 has two ribbed sections 80. The first grouping and the second grouping may be substantially similar to one another. In this way, the range the individual discrete riblets 82 are disposed on the airfoil 25 may be substantially similar, e.g., a first grouping extending 0-20% of the span-wise location of the airfoil 25 near the hub 21 and a second grouping extending 80-100% of the span-wise location of the airfoil 25 near the casing 19.

In some embodiments, the airfoil 25 includes a first density of individual discrete riblets 82 and a second density of individual discrete riblets 82. The densities of the individual discrete riblets 82 include the total number of riblets disposed over a portion of the span 84. In some embodiments, a first section 102 of the airfoil 25, including 20% of the span 84 and at the 0-20% span-wise location has riblets 82, comprises the first density. A second section 104 of the airfoil 25, including the remaining 80% of the span 84 and at the 0-80% span-wise location, comprises the second density. In this configuration, the first density is greater than the second density.

In further embodiments, the first section 102 of individual discrete riblets 82 may include the individual discrete riblets 82 disposed at the 80-100% of a span-wise location of the airfoil 25 from the root 27. In yet further embodiment, the first section 102 may include the individual discrete riblets 82 at the 0-20% and 80-100% span-wise location of the airfoil 25 from the root 27. The second section 104 includes the remaining portion of the span 84 not included in the first section 102. For example, if the first section 102 includes the individual discrete riblets 82 at the 0-20% and 80-100% span-wise location of the airfoil 25 from the root 27, the second section 104 includes the individual discrete riblets 82 at the 20-80% span-wise location of the airfoil 25 from the root 27.

The first section 102 may include, for example, approximately 280 riblets disposed on 20% of the span 84 of the airfoil 25. In some embodiments the first section includes approximately 550 riblets disposed on 20% of the span 84 of the airfoil 25. The 20% span may include the 0-20% span-wise location of the airfoil 25 from the root 27 and/or 80-100% span-wise location of the airfoil 25 from the root 27. In some embodiments, the second density is 0 such that there are no individual discrete riblets 82 disposed on the 20-80% span-wise location of the airfoil 25 from the root 27. In this way, the proportion of individual discrete riblets 82 disposed within the first section 102 may be adjusted as compared to the second section 104 to achieve the benefits of off-design conditions can be met while minimizing the cost involved. This increases the stall margin of the turbine engine 10 and in some instances increases the efficiency of the turbine engine 10 at least in throttle conditions. For instance, the second density may range from 50-100% less as compared to the first density, and in one illustrative embodiment, the second density is about 75% less than the first density.

By disposing the ribbed sections onto portions of the airfoil near the hub and/or the casing in a gas turbine engine, losses in efficiency due to flow weakness may be avoided. These locations, as noted above, tend to be the most prevalent locations where flow weakness occurs, which, if not controlled, may create flow separation. Further, these locations of weaknesses may be exacerbated when the gas turbine engine is operated at off-design conditions, for example, during throttle conditions. These in turn limit the stall margin of the associated stage. In instances where the riblets are disposed on the whole of the airfoil, the locations of relative weakness still remain since the benefit provided by the riblets would be provided to the whole of the airfoil, as opposed to focusing on a specific region or area of loss. In this way, the riblets disposed on select portions of the airfoil are capable of reducing waste in manufacturing time and costs, and also provides the benefits outlined herein.

Further aspects of the disclosure are provided by the subject matter of the following clauses:

A turbine engine compressor airfoil including: a body having a root coupled to a hub or casing of a turbine engine, the body extending in a radial direction from the root to a tip and in an axial direction from a leading edge to a trailing edge, the body defining a pressure side and a suction side opposite the pressure side, a ribbed section extending from the body on the suction side, the ribbed section comprising a plurality of discrete localized riblets, each riblet extending at least 90% of a chord length from the leading edge to the trailing edge at a span-wise location of the airfoil between the root and the tip, and wherein the ribbed section extends 0-20% of a span of the airfoil from the root to the tip.

The turbine engine compressor airfoil of the preceding clause, wherein the ribbed section is disposed at a 0-20% span-wise location from the root.

The turbine engine compressor airfoil of one or more of the preceding clauses, wherein the ribbed section is disposed at a 80-100% span-wise location from the root.

The turbine engine compressor airfoil of one or more of the preceding clauses, wherein the ribbed section is disposed on 100% of the chord length of the airfoil.

The turbine engine compressor airfoil of one or more of the preceding clauses, wherein the plurality of discrete localized riblets include a substantially triangular cross section along the span of the airfoil.

The turbine engine compressor airfoil of one or more of the preceding clauses, wherein each of the plurality of discrete localized riblets has a thickness between 0.015% to 0.12% of the chord length at the leading edge.

The turbine engine compressor airfoil of one or more of the preceding clauses, wherein each of the plurality of discrete localized riblets has a thickness between 0.015% to 0.24% of the chord length at the trailing edge.

The turbine engine compressor airfoil of one or more of the preceding clauses, wherein at least two the plurality of discrete localized riblets are not parallel to one another along the chord length of the airfoil.

The turbine engine compressor airfoil of one or more of the preceding clauses, wherein each of the plurality of discrete localized riblets has a varied thickness along the chord length of the airfoil.

A turbine engine compressor airfoil including: a body having a root coupled to a hub or casing of a turbine engine, the body extending in a radial direction from the root to a tip and in an axial direction from a leading edge to a trailing edge, the body defining a pressure side, and a suction side opposite the pressure side, a ribbed section on the suction side of the body, the ribbed section comprises a plurality of riblets each extending at least 90% of a chord length from the leading edge to the trailing edge at a span-wise location from the root to the tip, wherein the airfoil includes a first section and a second section, wherein the first section includes a first density of discrete localized riblets on the suction side and the second section includes a second density of discrete localized riblets on the suction side, wherein the first density is greater than the second density.

The turbine engine compressor airfoil of one or more of the preceding clauses, wherein the first section of discrete localized riblets is disposed at a 0-20% span-wise location from the root.

The turbine engine compressor airfoil of one or more of the preceding clauses, wherein the first section of discrete localized riblets is disposed at a 80-100% span-wise location from the root.

The turbine engine compressor airfoil of one or more of the preceding clauses, wherein the second section of discrete localized riblets is disposed between a 0%-20% and a 80-100% span-wise location.

The turbine engine compressor airfoil of one or more of the preceding clauses, wherein the second section of discrete localized riblets disposed between a 0%-20% and a 80-100% span-wise location and includes the second density that is 75% less than the first density of discrete localized riblets.

The turbine engine compressor airfoil of one or more of the preceding clauses, wherein the plurality of riblets are disposed on 100% of the chord length of the airfoil.

The turbine engine compressor airfoil of one or more of the preceding clauses, wherein the discrete localized riblets are substantially triangular shaped.

The turbine engine compressor airfoil of one or more of the preceding clauses, wherein each of the discrete localized riblets has a thickness of 0.015% to 0.12% of the chord length at the leading edge.

The turbine engine compressor airfoil of one or more of the preceding clauses, wherein each of the discrete localized riblets has a thickness of 0.015% to 0.24% of the chord length at the trailing edge.

The turbine engine compressor airfoil of one or more of the preceding clauses, wherein at least two of the discrete localized riblets are not parallel to one another along the chord length of the airfoil.

The turbine engine compressor airfoil of one or more of the preceding clauses, wherein the discrete localized riblets have a varied thickness along the chord length of the airfoil.

What is claimed is:

1. A turbine engine compressor airfoil, comprising:

a body having a root coupled to a hub or casing of a turbine engine, the body extending in a radial direction from the root to a tip and in an axial direction from a leading edge to a trailing edge, the body defining a pressure side and a suction side opposite the pressure side;

a ribbed section extending from the body on the suction side, the ribbed section comprising a plurality of discrete localized riblets, each riblet extending at least 90% of a chord length from the leading edge to the trailing edge at a span-wise location of the airfoil between the root and the tip, and wherein the ribbed section is 1%-20% of a span of the airfoil from the root to the tip, wherein a non-ribbed section is 80%-99% of the span.

2. The turbine engine compressor airfoil of claim 1, wherein the ribbed section is disposed within a 0-20% span-wise location from the root.

3. The turbine engine compressor airfoil of claim 1, wherein the ribbed section is disposed within an 80-100% span-wise location from the root.

4. The turbine engine compressor airfoil of claim 1, wherein the ribbed section is disposed on 100% of the chord length of the airfoil.

5. The turbine engine compressor airfoil of claim 1, wherein the plurality of discrete localized riblets include a substantially triangular cross section along the span of the airfoil.

6. The turbine engine compressor airfoil of claim 1, wherein each of the plurality of discrete localized riblets has a thickness between 0.015% to 0.12% of the chord length at the leading edge.

7. The turbine engine compressor airfoil of claim 1, wherein each of the plurality of discrete localized riblets has a thickness between 0.015% to 0.24% of the chord length at the trailing edge.

8. The turbine engine compressor airfoil of claim 1, wherein at least two the plurality of discrete localized riblets are not parallel to one another along the chord length of the airfoil.

9. The turbine engine compressor airfoil of claim 1, wherein each of the plurality of discrete localized riblets has a varied thickness along the chord length of the airfoil.

10. A turbine engine compressor airfoil comprising:

a body having a root coupled to a hub or casing of a turbine engine, the body extending in a radial direction from the root to a tip and in an axial direction from a leading edge to a trailing edge, the body defining a pressure side, and a suction side opposite the pressure side;

a ribbed section on the suction side of the body, the ribbed section comprises a plurality of riblets each extending at least 90% of a chord length from the leading edge to the trailing edge at a span-wise location from the root to the tip, wherein the airfoil includes a first section and a second section, wherein the first section includes a first density of discrete localized riblets on the suction side and the second section includes a second density of discrete localized riblets on the suction side, wherein the first density is greater than the second density, wherein the first density includes the ribbed section and is 1%-20% of a span from the root to the tip, and wherein the second density is 80%-99% of the span.

11. The turbine engine compressor airfoil of claim 10, wherein the first section of discrete localized riblets is disposed within a 0-20% span-wise location from the root.

12. The turbine engine compressor airfoil of claim 10, wherein the first section of discrete localized riblets is disposed within an 80-100% span-wise location from the root.

13. The turbine engine compressor airfoil of claim 10, wherein the second section of discrete localized riblets is disposed at least partially between a 0%-20% and an 80-100% span-wise location.

14. The turbine engine compressor airfoil of claim 10, wherein the second section of discrete localized riblets disposed at least partially between a 0%-20% and an 80-100% span-wise location and includes the second density that is 75% less than the first density of discrete localized riblets.

15. The turbine engine compressor airfoil of claim 10, wherein the plurality of riblets are disposed on 100% of the chord length of the airfoil.

16. The turbine engine compressor airfoil of claim 10, wherein the discrete localized riblets are substantially triangular shaped.

17. The turbine engine compressor airfoil of claim 10, wherein each of the discrete localized riblets has a thickness of 0.015% to 0.12% of the chord length at the leading edge.

18. The turbine engine compressor airfoil of claim 10, wherein each of the discrete localized riblets has a thickness of 0.015% to 0.24% of the chord length at the trailing edge.

19. The turbine engine compressor airfoil of claim 10, wherein at least two of the discrete localized riblets are not parallel to one another along the chord length of the airfoil.

20. The turbine engine compressor airfoil of claim 10, wherein the discrete localized riblets have a varied thickness along the chord length of the airfoil.

* * * * *